Figure 6:
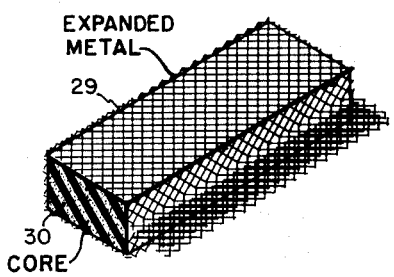

Sept. 14, 1965   A. M. GOODLOE   3,206,536
EXPANDED METAL RF RADIATION SHIELDING GASKET
Filed April 24, 1963                                              3 Sheets-Sheet 1
FIGURE 1
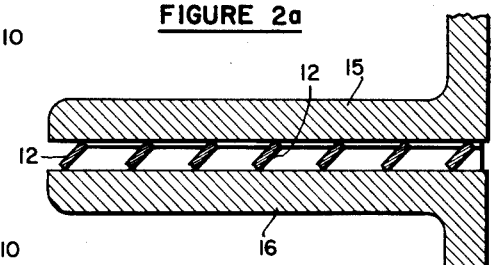
FIGURE 2a
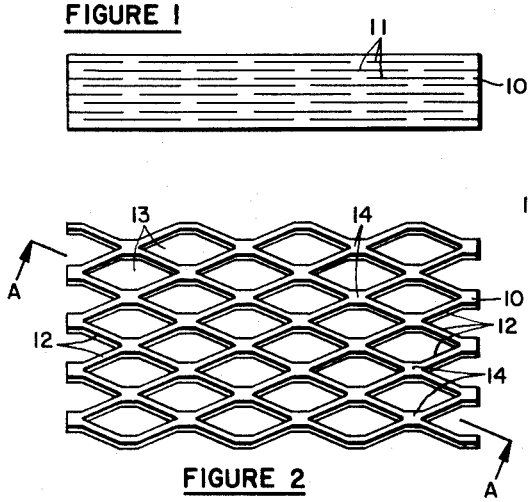
FIGURE 2
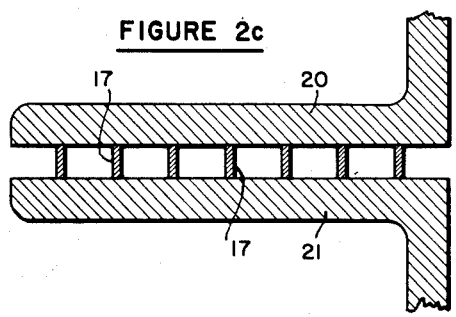
FIGURE 2c
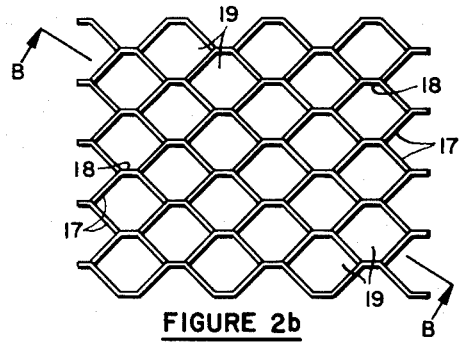
FIGURE 2b
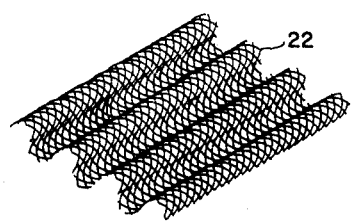
FIGURE 3
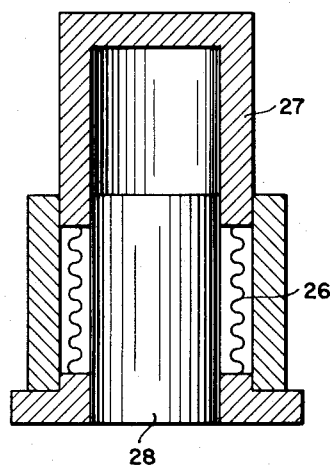
FIGURE 5
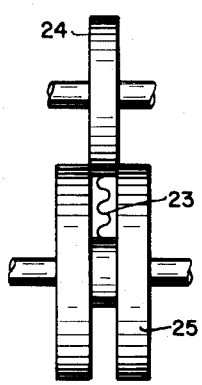
FIGURE 4
ALFRED M. GOODLOE   INVENTOR
BY  Frank A. Sinnock
ATTORNEY Sept. 14, 1965  A. M. GOODLOE  3,206,536

EXPANDED METAL RF RADIATION SHIELDING GASKET

Filed April 24, 1963  3 Sheets-Sheet 2

ALFRED M. GOODLOE  INVENTOR

BY *Frank A. Simrock*

ATTORNEY

ALFRED M. GOODLOE  INVENTOR

3,206,536
EXPANDED METAL RF RADIATION SHIELDING GASKET
Alfred M. Goodloe, 105A Duncan Hill Apartments, 1000 Central Ave., Westfield, N.J.
Filed Apr. 24, 1963, Ser. No. 275,393
16 Claims. (Cl. 174—35)

The present invention relates to new and improved RF shielding gaskets and processes for their preparation. More particularly, this invention relates to such gaskets which are inexpensive and yet much more efficient, particularly under relatively light pressure, than all commercially available RF gaskets in their ability to give continuous shielding in joining two flanges of an RF shield. Yet more particularly, this invention relates to RF shielding gaskets prepared from expanded metal, i.e. slitted sheets stretched perpendicularly to the slits, critically expanded so that the webs so formed are at an angle of 20 to 70°, e.g. 45° to the plane of the sheet. Most particularly, in a preferred embodiment, this invention relates to such metal gaskets which in addition utilize a core of soft rubbery material and provide excellent shielding under minimum pressure by the abutting members.

Metal high frequency shielding gaskets or the like formed from knitted or woven wire mesh, which provide a bridging but generally non-continuous metallic contact as to the individual strands between abutted members of the shield within which electronic apparatus is housed are the gaskets most widely used today. These gaskets are not sufficiently efficient to meet today's advanced civilian and military needs and in addition require great pressure to be exerted upon the gasket by the abutted members. Thus, as is well known, the metal abutting flange surfaces, of RF shields even finely machined, are composed of myriad hills and valleys so that in the absence of very resilient metal gaskets contacting is made, for example, only at three high points. Additionally, due to the metal oxide film always present covering the flanges poor electrical contact is made since the rounded or flattened wires do not sufficiently bite through the metal oxide film in the absence of the application of very high pressure on the gasket by the flanges. Thus, as a homely illustration, with conventional gaskets it is well known that noise level continually decreases as more and more pressure is brought to bear on the gasket by tightening the flange bolts. Obviously, the necessity of this kind of pressure fitting is undesirable and even practically impossible where the gasket is, for example, a strip at the edges of a cabinet door.

In another commercially available gasket a tube of knitted mesh surrounds a bar of soft rubber. However, here again the round cross section wires do not bite through the metal oxide film and in addition the path of a continuous single wire from one flange to the other is very long and tenuous and contacting between wires of the gasket of course also does not provide an electrical path equivalent to a continuous conductor.

In the present inventor's prior patent, U.S. 2,674,644, there was described a novel construction shielding gasket which not only provided necessary resilient metallic bridging contact between the members of the shielding enclosure but also provided a resiliently compressible sealing body effective to exclude water, dust, maintain pressure in aircraft equipment, etc., without interfering with or impairing the high frequency shielding effect of the gasket. Thus, the shielding and sealing gasket was produced from tubular or flat knit metallic wire mesh, through which mesh a thin sheet of uncured rubber had been pressed so that the mesh openings were filled with the rubber. A suitable number of such rubber filled knitted metallic mesh layer were superimposed to provide a body thickness equivalent to the desired radial width of gasket to be produced, and then the assembled layers were consolidated by vulcanization into a unitary body. From the body thus produced gasket bodies of desired thickness were cut away, the cut being made perpendicular to the layers of mesh so as to pass axially through successive mesh courses. Thereby wire strands were provided extending uninterruptedly across the thickness of the gasket body from one face thereof to the other. However, the path was tortuous and as will be developed below, (1) insufficient angle with the surfaces was provided with the wire strands to bite through the oxide film on the flanges thus providing discontinuities and (2) rebroadcasting of interference was obtained due to the presence of ungrounded conductors parallel to the flange surfaces. Nevertheless this gasket is commercially used and was the best shielding and sealing gasket (however requiring high flange pressure) known until recently work done for the U.S. Air Force by Armour Institute indicated that gaskets having considerably superior shielding properties could be developed.

According to tests made by the Armour Institute, it was found that the most satisfactory type of shielding for suppressing radio noise was where there existed a multiplicity of small wires insulated from each other and having a suitable shape and placed in a position so that each end of each wire would bite into or break into the oxidized film on each part of the closing members or flanges. Thus, such a gasket (ideally if it were possible to make each wire bite through the oxide film on both flanges) prevented leakage both (1) between the surfaces of the gasket and the flanges and (2) through the entire thickness of the gasket wherever ungrounded wires were present (i.e. the metal in the gasket must be grounded for good shielding). It was further disclosed that mechanical isolation and insulation of the wires was necessary since any conductors not in effective electrical contact with the flanges i.e. not grounded, particularly extending parallel to the flange surfaces acted as antennae to conduct radio frequency electrical energy to the outside of the container (where it is of course efficiently radiated). While the gasket discovered by the Armour Institute from a shielding standpoint was very good, the method described for making the gasket was commercially impractical and so far as is known the gasket was never manufactured for sale. This method (described in U.S. 2,885,459) involved impregnating card cloth (a material used in the textile industry for carding fibers, e.g. wool) with rubber and then cutting off the exposed wire ends closely adjacent to the front and back surfaces of the rubber. Unfortunately, with the soft rubber required for resilient sealing, the wires which in said card cloth contained a single angle bend tended to rotate under the pressure applied in the cutting step. This caused contacting between wires and thus undesirable conduction of radio frequency energy to the outside of the shielding container. This was also true of the alternate method described, i.e. passing a rubber sheet through a stapling machine and then cutting off the staples on both sides to the desired length. Further, it was difficult to cut the wires off flush with the rubber. Patentees apparently failed to visualize any other means for obtaining a gasket having the necessary properties for high efficiency electrical shielding developed by the study.

The present invention will be more clearly understood from a consideration of the accompanying drawings depicting preferred embodiments of this invention. FIGURE 1 is a plan view of one form of slitted metallic or like sheet ready for expansion. FIGURE 2 is a perspective view of the slitted sheet of FIGURE 1 after the desired expansion to position the webs at approximately a 45° angle to the plane of the sheet. FIGURE 2a is a sectional view of the expanded metal gasket disposed between flange surfaces. FIGURE 2b represents for comparison the same slitted sheet overexpanded, i.e. stretched further, so that the webs are positioned at a 90° angle to the plane of the sheet producing a poor shielding material. FIGURE 2c is a sectional view of the overexpanded metal gasket of FIGURE 2b disposed between flange surfaces. FIGURE 3 represents a slitted sheet crimped perpendicularly or parallel to the slits after expanding. FIGURE 4 represents a calendering device for compressing a crimped sheet to obtain a thicker and more dense final sheet material. FIGURE 5 represents a device for preparing a compressed tube of crimped expanded material. FIGURES 6 through 8a represent various embodiments of a final shielded material combining a sponge rubber core with single or double ply uncrimped expanded metal or single or double ply crimped uncompressed expanded metal. FIGURES 9 through 16 represent preferred shapes for commercial sales of final gasketing materials of this invention.

Referring to the figures in FIGURE 1 the reference character 10 indicates a flat sheet of metal or other suitable conducting material, the same being selected of a suitable width and length. This sheet 10 is provided with laterally spaced longitudinally extending rows of slits 11 of suitable length and so arranged so that the slits of alternate rows are disposed in uniformly staggered relation. The slitted sheet 10 preferably comprises any metal having high electrical conductivity, i.e. aluminum, copper, alloys of copper and zinc, e.g. brass, alloys of nickel and copper, e.g. Monel, silver plated brass, etc. approximately .001 to .020 inch in thickness. The optimum thickness depending upon the metal and the nature of the gasket desired is preferably in the range of 0.0025 to 0.006 inch.

Referring to FIGURE 2, this figure represents the metal 10 of FIGURE 1 expanded by stretching perpendicularly to the slits to provide an open mesh network of webs 12 which enclose diamond shaped openings 13. The webs 12 intersect at the junctions 14 which have a width twice that of the webs 12. The webs are thin and in general flat in cross section and the flat planes of the individual webs are in general at the same angle to the general plane of the sheet material of about 45°. As can be seen from FIGURE 2a representing a cross section through AA, the webs 12 in this 45° position present sharp cutting edges which bite through the oxide film of the flanges 15 and 16 of a radiation shield when these flanges are pressed together against the gasket. It should be noted that in manufacture the material can be prepared either by arranging the slits parallel to the length of the stock and stretching from the sides or by arranging the slits perpendicular to the length of the stock and stretching lengthwise. The critical aspect of the present invention is to have the majority of the webs positioned at an angle of 20 to 70° to the plane of the original sheet, preferably 35 to 55° to obtain the necessary cutting of the oxide film. In a preferred embodiment this may be obtained by stretching so that the long way dimension of the diamond shaped opening can be from 1/64 inch to 3/4 inch, preferably 1/16 to 5/64 inch and the short way of the diamond can be 1/32 inch to 1/2 inch, preferably 3/64 to 5/64 inch. The most desirable length appears to be approximately 3/32 inch long by 1/16 inch wide. Additionally, the width of the strand or web of metal surrounding the diamond shaped opening is preferably from 0.015 to 0.020 inch, however, a strand width in the range of 0.06 to 1/8 inch is also satisfactory. It should be noted that the combination of sharp cutting surfaces biting through the oxide film of the flanges even under low flange pressure, which cutting surfaces are joined through solid metal, overcomes the major problems with all prior art shielding gaskets. It is further noted that the junctions also are turned up at an angle to the sheet and also cut through the oxide film.

Referring to FIGURE 2c this figure, presented for comparison only, represents a slitted sheet which has been over-expanded, i.e. stretched further, so that the webs 17 and junctions 18 enclosing in general square shaped openings 19 are positioned at a 90° angle to the plane of the sheet thus producing a flat surface equal to the thickness of the original sheet which does not bite through the oxide film. Thus, FIGURE 2c representing a cross section through BB shows the webs 17 presssed between the flanges 20 and 21 with the flat surface "edge" of the web (equal to the thickness of the original slitted sheet) positioned parallel to the flange surfaces. In this connection it should also be noted that much expanded metal commercially sold particularly for decorative purposes is rolled after expansion intentionally to remove the sharp edges.

FIGURE 3 represents a corrugated expanded metal sheet 22 which may be prepared by the corrugation methods described in U.S. 2,989,145 of the present inventor. This sheet is preferably prepared by after expansion corrugating parallel to the original direction of the slits. It may also be prepared by corrugating after expansion perpendicular to the original direction of the slits. The corrugated sheet preferably has corrugations as follows: distance between peaks 4/32 to 8/32 in., depth of corrugation (peak to valley) 1/16 to 1/4 in.

This corrugated sheet may be used as a compressed stock as will be described or can be used in a less preferred embodiment in the embodiments described below exactly as described for the non-corrugated materials.

FIGURE 4 represents a device for loosely compressing the expanded corrugated material by calendering. More than one sheet of corrugated material, e.g. 1 to 25, depending upon the flange width desired. The desired initial thickness may also be obtained by folding a single sheet, rather than by using separate sheets. Referring to the figure the corrugated material 23 is compressed between roller 24 within the pulley wheel 25. Final product from this calendering may be either a square bar, rectangular bar or other shaped bar.

Referring to FIGURE 5 similar compression of a tube of one or more thicknesses of crimped material 26 by plunger 27 and corresponding die 28 is shown. This, of course, produces preferably after slicing to obtain the desired thickness, a circular washer type material suitable for use as e.g. gaskets for tube covers. It should be noted that the compressed crimped material still retains much of the desired configuration for the webs to bite through the oxide film of the flanges. This is not the case with random compression of uncrimped expanded metal.

FIGURE 6 shows gasketing material 29 having a soft sponge rubbery core 30 with the expanded metal folded around same and with the ends extending outwardly for attachment e.g. by bolt holes (not shown), etc. to a flange. Alternatively, the material extending outwardly can be omitted and the joining ends of the expanded material merely be cemented to the rubber core at the side, or folded under at the top and bottom of the bar and cemented, the folds preventing cement from seeping to the surface and interfering with electrical contact. The rubber core is preferably of square, rectangular or circular cross section, most preferably a rectangular cross section flat bar.

Figure 7:
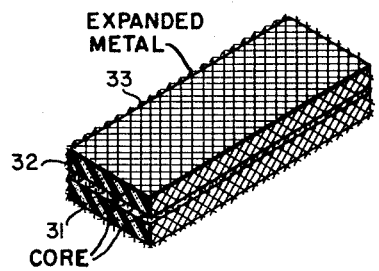

FIGURE 7 represents a similar gasket prepared from two bars 31 and 32 of a soft sponge rubber material, the expanded metal 33 starting, for example, at the upper side of the lower bar 31, being wrapped around and under the bar, brought over the top of the first bar and then brought around and under this bar to obtain a final material having no exposed cut edges. Alternatively, the same method can be used to obtain a bar having an expanded metal tab for attachment with bolt holes to a flange as described in connection with the preceding figure by using two separate sheets of expanded metal, one end of each expanded sheet being positioned between the bars and the other ends being wrapped around and extending outwardly at the opposite side.

Figure 8:
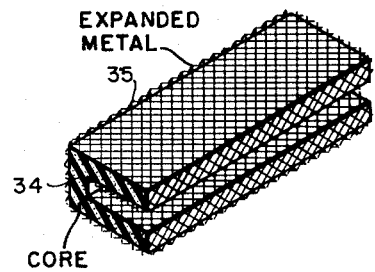

Alternatively, as shown in FIGURE 8, instead of using two bars, a single bar 34 having a slot in one side provided for tucking in exposed edges of expanded metal 35, i.e. the edges between the bars shown in FIGURE 7 can be used.

Figure 8A:
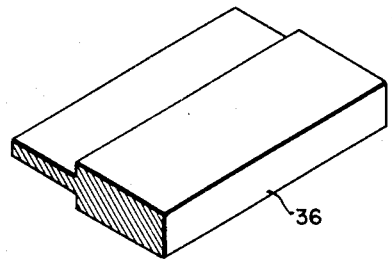

FIGURE 8a with FIGURE 8 represent a gasket material (shown as two parts before assembly) which when brought together between two flanges forms a shielding element which has either a definite stop of incompressible material to avoid compressing the rubbery material beyond a certain point or a stop of rubbery material less compressible than the expanded metal covered bar which provides a pressure seal between the flanges. Thus, in this embodiment the slotted bar 34 previously described is covered with expanded metal 35, also as previously described and positioned opposite the slot is a key way bar 36 of either relatively incompressible material or of rubber material less compressible than the slotted bar of smaller thickness than the slotted bar. Thus, upon assembly the key way of the bar fits into the slot and in the final gasket the bar attached to the key way stops compression and/or seals at its thickness. If desired, the key way bar may have bolt holes for attachment to one of the flanges of the RF shield.

It is of the utmost commercial significance that these sponge rubber bar embodiments provide for the first time a gasket having excellent shielding properties under low flange pressure. Thus, the flexible expanded metal is caused to follow the contours of imperfections in the flanges, e.g. cabinet doors by the sponge rubber. Thus, sponge rubber is prefrably of soft density, e.g. a ⅛ inch thick strip 2½ inches long by 1 inch wide will be compressed 25% by 9½ to 16 p.s.i. pressure. Medium density sponge rubber may also be used. Besides sponge rubber polyurethane foams may also be advantageously used.

With respect to the embodiments shown in FIGURES 2a, 2b, 3, 6-8, instead of one sheet of expanded metal two or more sheets may be used to obtain a thicker gasket material. In a preferred embodiment with multiple ply sheets the thickness will be 2 sheets and the double ply material is glued to the rubber bar(s) thus preventing any displacement of the expanded metal from the bar. One advantage of the double ply is that the adhesive coats only the interior ply and no danger of glue interfering with the web cutting action is encounterd.

In another particularly preferred embodiment the expanded metal shown in FIGURE 2 is coated or impregnated with uncured rubber, preferably neoprene or silicon rubber. This rubber is prefrably of medium durometer, e.g. 35 to 45 and is, of course, not sponge rubber. This may be done by either dipping the sheet of expanded metal in rubber or by rolling a sheet of uncured rubber into the sheet of expanded metal. This step is not critical and the only purpose is to cover the metal with rubber. Following impregnation and prefrably after curing, the rubber impregnated sheet is treated to remove the outer layer of rubber from both sides so as to expose either the junctions or both the junctions and the webs. This may suitably be done by brushing or grinding with a wire scratch brush preferably in a direction to push the webs to a greater angle. In a preferred embodiment following brushing the exposed junctions or junctions and webs are exposed further by pressing the coated expanded metal sheet into soft material, i.e. corrugated cardboard or soft nonsticking rubber to further push the rubber down from the webs and junctions.

Figure 9:
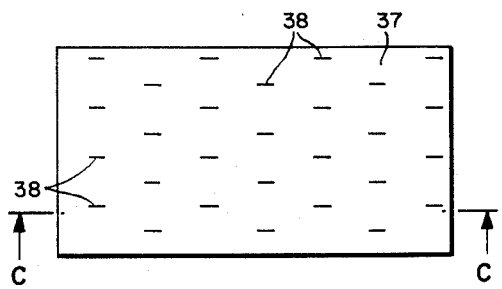

Referring to the drawing, FIGURE 9 shows a top view of a finished sheet 37 of expanded metal coated with rubber having only the junctions 38 exposed. It is noted that the junctions have the highest elevation from the plane of the sheet. FIGURE 10 again shows a top view of a finished expanded metal coated with rubber sheet 39 wherein both the junctions 40 and the webs 41 are exposed, i.e. by deeper brushing to remove more rubber.

Figure 10:
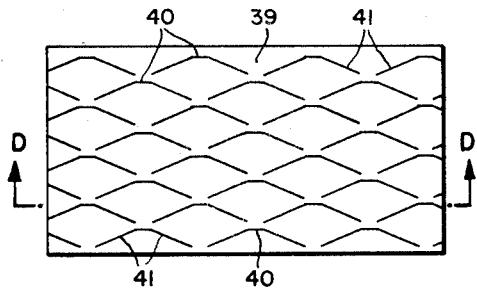
Figure 9A:
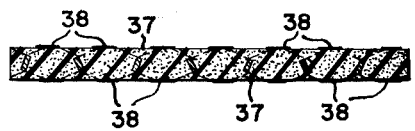
Figure 10A:
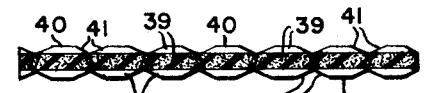

FIGURES 9a and 10a present cross sectional views of the structure of FIGURES 9 and 10 respectively taken through sections CC and DD. Identifying numerals in the sectional views correspond to those in FIGURES 9 and 10.

Figure 11:
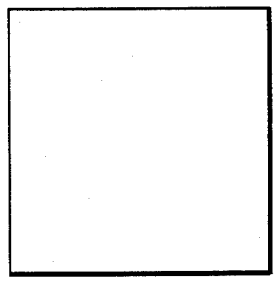
Figure 12:
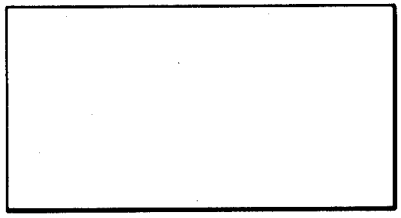
Figure 13:
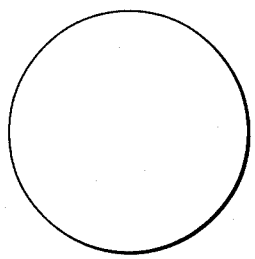
Figure 14:
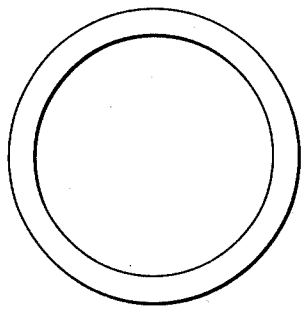
Figures 15, 15A:
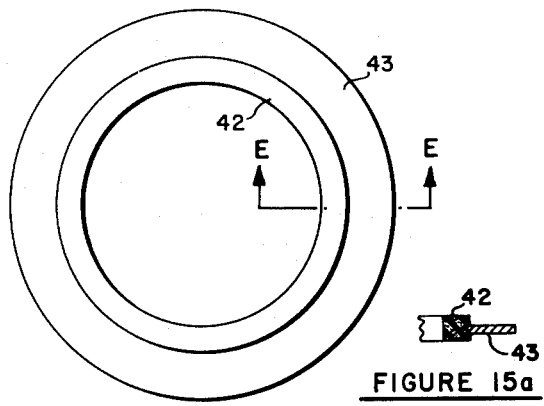
Figure 16:
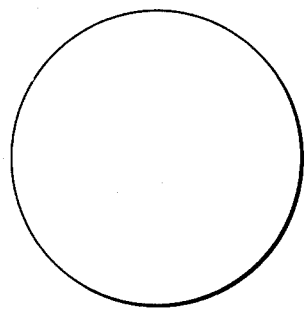

Preferred shapes for commercial sales of the final gasketing materials of this invention are shown in FIGURES 11 through 16. FIGURES 11, 12 and 13 represent an end view of a square, rectangular and circular cross section bar of gasketing material supplied in any length desired. FIGURE 14 represents a circular washer type gasket for use as a gasket for tube can, etc. FIGURE 15 represents the same washer type gasket, this time having particularly a section 42 of sponge rubber with in covered expanded metal, an outer section 43 of incompressible material to provide a stop against overcompression by the flanges or resilient compressible material, less compressible than the sponge rubber to provide a pressure seal. FIGURE 15a presents a cross sectional view of FIGURE 15 taken through section EE. Identifying numerals in the sectional view correspond to those in FIGURE 15. FIGURE 16 represents a flat circular disc of gasket material provided so that the desired radial thickness washer can be obtained by cutting out a center section. In all of the embodiments above the shielding width (i.e. the width of gasket provided to prevent the signal from passing out between the flanges will be preferably ⅛ to 1 inch). The impregnated expanded metal sheet mebodiment may also be sold as washers of other shapes than circular e.g. square, rectangular, etc. and may also be sold as a sheet of material ½ inch to 8 inches in width of any length from which the customer can cut out his own shape of RF shield gasket. FIGURE 12 also represents this latter embodiment.

It is to be understood that this invention is not limited to the specific embodiments described above and that modifications may be made without departing from the spirit of the invention.

What is claimed is:

1. An RF radiation shield structure comprising in combination members of an RF radiation shield having surfaces joined together and a shielding gasket positioned between and in contact with said surfaces, the said gasket being at least one sheet of expanded metal positioned so that the plane of the sheet is parallel to the plane of said surfaces, the sheet of expanded metal being critically expanded, the webs of the expanded metal being positioned at an angle of 20° to 70° to the plane of the sheet.

2. The RF radiation shield structures of claim 1 in which the metal of the shielding gasket before expansion is .001 to .020 inch in thickness, the expanded metal has diamond shaped openings 1/64 to ¾ inch in length and 1/16 to 8/64 inch in width, the webs are positioned at an angle of 35 to 55° to the plane of the sheet and the webs have a strand width in the range of .06 to ⅛ inch.

3. The RF radiation shield structure of claim 1 in which the sheet of expanded metal also is crimped to obtain corrugations of the distance between peaks of 4/32 to 8/32 inch and depth of corrugation (peak to valley) of 1/16 to ¼ inch.

4. A shielding gasket material for the purposes described comprising a sheet of expanded metal critically expanded, the webs of said sheet of expanded metal being disposed at an angle of 20 to 70° to the plane of the sheet, the said expanded metal being critically impregnated with rubber with the upper and lower edges of the junctions of the expanded metal sheet protruding from the rubber.

5. The shielding gasket material of claim 4 in which the metal before expansion is .001 to .020 inch in thickness, the expanded metal has diamond shaped openings 1/64 to ¾ inch in length and 1/16 to 8/64 inch in width, the webs are positioned at an angle of 35 to 55° to the plane of the sheet and the webs have a strand width in the range of .06 to 1/8 inch.

6. The shielding gasket material of claim 5 wherein the gasket material is of washer shape.

7. The shielding gasket material of claim 5 wherein the gasket material is 1/2 inch to 8 inches in width and of a length above 20 inches.

8. A shielding gasket material for the purposes described comprising a sheet of expanded metal, critically expanded, the webs of said sheet of expanded metal being disposed at an angle of 20 to 70° to the plane of the sheet, the said expanded metal being critically impregnated with rubber with the upper and lower edges of the junctions and webs of the expanded metal protruding from the rubber.

9. The shielding gasket material of claim 8 in which the metal before expansion is .001 to .020 inch in thickness, the expanded metal has diamond shaped openings 1/64 to 3/4 inch in length and 1/16 to 5/64 inch in width, the webs are positioned at an angle of 35 to 55° to the plane of the sheet and the webs have a strand width in the range of .06 to 1/8 inch.

10. The shielding gasket material of claim 9 of washer shape.

11. The shielding gasket material of claim 9 1/2 inch to 8 inches in width and of a length above 20 inches.

12. A shielding gasket for the purposes described comprising a bar of sponge rubber covered over at least a substantial portion of its longitudinal sides with at least one continuous sheet of expanded metal critically expanded, the webs of the expanded metal being positioned at an angle of 20° to 70° to the plane of the sheet.

13. The shielding gasket of claim 12 in which the metal before expansion is .001 to .020 inch in thickness, the expanded metal has diamond shaped openings 1/64 to 3/4 inch in length and 1/16 to 5/64 inch in width, the webs are positioned at an angle of 35 to 55° to the plane of the sheet and the webs have a strand width in the range of .06 to 1/8 inch.

14. The shielding gasket material of claim 13 in which two sheets of expanded metal positioned one on top of the other cover the bar of sponge rubber and the inner sheet is glued to the said bar.

15. An RF radiation shield structure comprising in combination members of an RF radiation shield having surfaces joined together and a shielding gasket positioned between and in contact with said surfaces, the said gasket being at least one sheet of expanded metal positioned so that the plane of the sheet is parallel to the plane of said surfaces, the sheet of expanded metal being critically expanded, the webs of the expanded metal being positioned at an angle of 20° to 70° to the plane of the sheet and the sheet of expanded metal being critically impregnated with rubber so that the upper and lower edges of the junctions of the expanded metal sheet protrude from the rubber.

16. An RF radiation shield structure comprising in combination members of an RF radiation shield having surfaces joined together and a shielding gasket positioned between and in contact with said surfaces, the said gasket being at least one sheet of expanded metal positioned so that the plane of the sheet is parallel to the plane of said surfaces, the sheet of expanded metal being critically expanded, the webs of the expanded metal being positioned at an angle of 20° to 70° to the plane of the sheet and the sheet of expanded metal being critically impregnated with rubber so that the upper and lower edges of the junctions and webs of the expanded metal sheet protrude from the rubber.

References Cited by the Examiner

UNITED STATES PATENTS

| | | | |
|---|---|---|---|
| 1,562,191 | 11/25 | Reno | 50—500 |
| 1,637,410 | 8/27 | Coryell | 50—500 X |
| 2,989,145 | 6/61 | Goodloe | 29—163 X |

JOHN F. BURNS, *Primary Examiner.*

JOHN P. WILDMAN, DARRELL L. CLAY,
*Examiners.*